United States Patent
Hikichi et al.

(10) Patent No.: US 10,234,308 B2
(45) Date of Patent: Mar. 19, 2019

(54) ENCODER, MANUFACTURING METHOD OF ENCODER SCALE, MANUFACTURING METHOD OF ENCODER, AND DRIVING APPARATUS

(71) Applicant: NIKON CORPORATION, Tokyo (JP)

(72) Inventors: Shintaro Hikichi, Sendai (JP); Hideaki Sugiyama, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 184 days.

(21) Appl. No.: 15/446,714

(22) Filed: Mar. 1, 2017

(65) Prior Publication Data

US 2017/0176216 A1 Jun. 22, 2017

Related U.S. Application Data

(62) Division of application No. 14/368,355, filed as application No. PCT/JP2012/083897 on Dec. 27, 2012, now abandoned.

(30) Foreign Application Priority Data

Dec. 28, 2011 (JP) ................................ 2011-287350

(51) Int. Cl.
| | |
|---|---|
| *G01D 5/165* | (2006.01) |
| *G01D 5/347* | (2006.01) |
| *G01D 5/12* | (2006.01) |
| *H02K 5/02* | (2006.01) |
| *H02K 15/00* | (2006.01) |

(52) U.S. Cl.
CPC ............ *G01D 5/165* (2013.01); *G01D 5/12* (2013.01); *G01D 5/34707* (2013.01); *H02K 5/02* (2013.01); *H02K 15/00* (2013.01); *G01D 5/3473* (2013.01)

(58) Field of Classification Search
CPC ......................... G01N 33/2847; G01N 27/07
See application file for complete search history.

(56) References Cited

U.S. PATENT DOCUMENTS

| | | | |
|---|---|---|---|
| 4,803,354 A | | 2/1989 | Onodera et al. |
| 4,954,218 A | * | 9/1990 | Okumura ............ H01L 21/0332 257/770 |
| 5,754,341 A | | 5/1998 | Takata et al. |
| (Continued) | | | |

FOREIGN PATENT DOCUMENTS

| | | |
|---|---|---|
| JP | S61-243321 A | 10/1986 |
| JP | 2007-121142 A | 5/2007 |
| (Continued) | | |

OTHER PUBLICATIONS

Jul. 11, 2017 Office Action issued in Japanese Application No. 2016-148386.

(Continued)

*Primary Examiner* — Tung X Nguyen
*Assistant Examiner* — Dominic Hawkins
(74) *Attorney, Agent, or Firm* — Oliff PLC (57) ABSTRACT

An encoder includes a scale unit having a substrate configured of a metal material and in which a pattern is formed on a first surface of the substrate and a passive state member is formed on a second surface different from the first surface in the substrate, and a detection unit that is configured to move relative to the scale unit and detects the pattern.

9 Claims, 7 Drawing Sheets

(56) References Cited

U.S. PATENT DOCUMENTS

| | | | |
|---|---|---|---|
| 7,916,045 B2* | 3/2011 | Tominaga | G01D 5/34707 341/13 |
| 9,258,007 B2* | 2/2016 | Aoki | G01D 5/34707 |
| 2005/0078015 A1 | 4/2005 | Ferran et al. | |
| 2005/0207013 A1 | 9/2005 | Kanno et al. | |
| 2005/0285026 A1 | 12/2005 | Kawai et al. | |
| 2007/0101571 A1 | 5/2007 | Kataoka et al. | |
| 2009/0120904 A1 | 5/2009 | Imada et al. | |
| 2009/0170274 A1 | 7/2009 | Kamijima et al. | |
| 2009/0267803 A1* | 10/2009 | Tominaga | G01D 5/34707 341/13 |
| 2009/0316155 A1* | 12/2009 | Yaku | G01D 5/34707 356/445 |
| 2010/0193671 A1 | 8/2010 | Oshida et al. | |
| 2010/0301843 A1 | 12/2010 | Kronowitter et al. | |
| 2011/0273166 A1* | 11/2011 | Salt | G01D 5/147 324/207.24 |
| 2012/0064709 A1 | 3/2012 | Jeon et al. | |

FOREIGN PATENT DOCUMENTS

| | | |
|---|---|---|
| JP | 2009-264923 A | 11/2009 |
| JP | 2010-271174 A | 12/2010 |

OTHER PUBLICATIONS

Nov. 3, 2015 Office Action issued in Chinese Application No. 201280069186.5.
May 19, 2016 Office Action issued in U.S. Appl. No. 14/368,355.
Jun. 7, 2016 Office Action issued in Japanese Application 2013-551797.
Dec. 1, 2016 Office Action issued in U.S. Appl. No. 14/368,355.
Mar. 26, 2013 International Search Report issued in International Patent Application No. PCT/JP2012/083897.
Mar. 26, 2013 Written Opinion of the International Search Authority issued in International Patent Application No. PCT/JP2012/083897.

* cited by examiner

ENCODER, MANUFACTURING METHOD OF ENCODER SCALE, MANUFACTURING METHOD OF ENCODER, AND DRIVING APPARATUS

The present invention relates to an encoder, a manufacturing method of an encoder scale, a manufacturing method of an encoder, and a driving apparatus.

This application is a divisional application of U.S. patent application Ser. No. 14/368,355, filed Oct. 14, 2014 and claims priority to Japanese Patent Application No. 2011-287350, filed Dec. 28, 2011, the content of which is incorporated herein by reference.

TECHNICAL FIELD

Background

As an apparatus which detects rotation information such as a rotating speed, a rotation angle, and a rotation position of a rotating body including a rotating shaft or the like of a motor, an encoder is known. As one kind of encoder, for example, a reflection type optical encoder is known (for example, refer to Patent Document 1). For example, the reflection type optical encoder includes a disk member in which a reflection region and a non-reflection region are formed on the surface, detects light reflected from the reflection region by a light-receiving element, and detects the rotation information.

When the disk member is manufactured, for example, a light absorption layer is patterned on a surface of a substrate, which is formed in a mirror surface form, by a method such as a photolithography method. For example, after a multilayer film is formed on the surface of the substrate, a process of immersing the substrate into etching liquid and then etching the multilayer film is performed.

RELATED ART DOCUMENTS

Patent Documents

[Patent Document 1] Japanese Unexamined Patent Application, First Publication No. 2007-121142

SUMMARY OF INVENTION

Problems to be Solved by the Invention

However, for example, when a substrate is formed using a material which dissolves in an etching liquid, such as untreated aluminum (for example, pure aluminum), a portion of a substrate is dissolved when the substrate is immersed into the etching liquid, and the dissolved aluminum remains between patterns, which may interfere with the etching processing. Accordingly, patterning accuracy may be decreased, and a decrease in a yield rate may occur.

An object of aspects of the present invention is to provide an encoder, a manufacturing method of an encoder, and a driving apparatus capable of preventing a decrease in a yield rate.

Means for Solving the Problem

According to a first aspect of the present invention, an encoder is provided, including: a scale unit having a substrate configured of a metal material and in which a pattern is formed on a first surface of the substrate and a passive state member is formed on a second surface different from the first surface in the substrate; and a detection unit that is configured to move relative to the scale unit and detects the pattern.

According to a second aspect of the present invention, a manufacturing method of an encoder scale is provided, including: a passive state member-forming process of forming a passive state member on a second surface different from a first surface on which a pattern is formed in a substrate configured of a metal material; a pattern layer-forming process of forming a pattern layer on the first surface; and an etching process which immerses the substrate into an etching solution, removes a portion of the pattern layer, and forms the pattern.

According to a third aspect of the present invention, a manufacturing method of an encoder is provided, including: the manufacturing method of an encoder scale according to the second aspect of the present invention; and a detection unit-forming process of forming a detection unit which detects the pattern.

According to a fourth aspect of the present invention, a driving apparatus is provided, including the encoder according to the first aspect of the present invention.

Advantage of the Invention

According to the aspects of the present invention, it is possible to provide a manufacturing method of an encoder scale, a manufacturing method of an encoder, an encoder, and a driving apparatus capable of preventing a decrease in a yield rate.

DESCRIPTION OF EMBODIMENTS

Hereinafter, an embodiment of the present invention be described with reference to the drawings.

Figure 1:
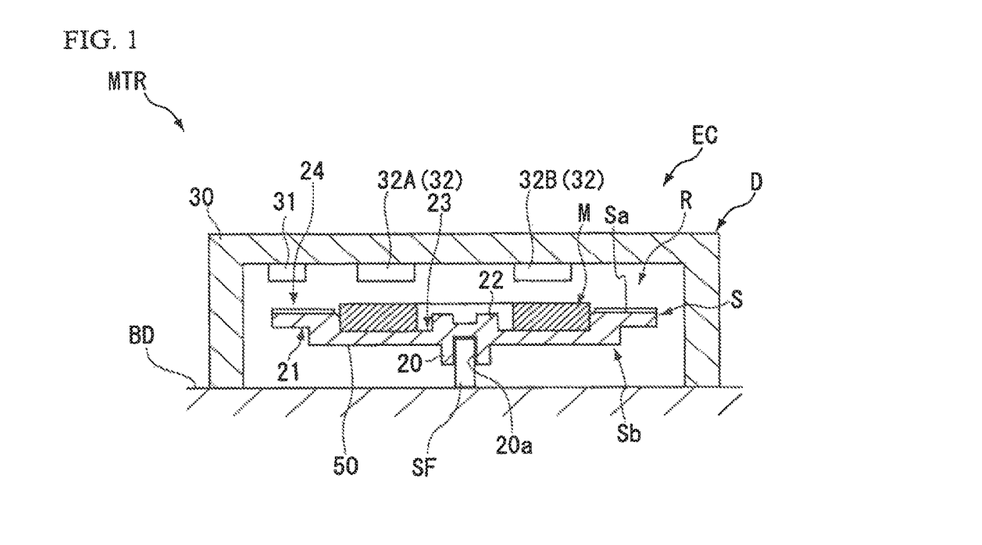
FIG. 1 is a diagram showing a configuration of a driving apparatus (motor apparatus) according to an embodiment of the present invention.

FIG. 1 is a cross-sectional diagram showing a configuration of a motor apparatus MTR as an example of a driving apparatus (measuring target).

As shown in FIG. 1, the motor apparatus MTR includes a moving shaft (rotating shaft) SF which is a moving body (rotor), a motor main body BD which is a driving unit rotating the rotating shaft SF, and an encoder EC which detects movement information (for example, rotation information) of the rotating shaft SF. In order to detect movement information of the moving body, the encoder EC includes a scale unit (rotatory member, scale) R and a detection unit D which moves relative to the scale unit. The encoder EC is used in a state where the rotatory member R is accommodated in a casing 30 configuring the detection unit D. In addition, the encoder EC of the present embodiment is configured so that the scale unit (rotatory member) R moves in a movement direction (for example, rotation direction).

The rotatory member R includes a disk member (substrate) S and a magnet member M.

The disk member S is fixed to the rotating shaft SF. The disk member S is integrally rotated with respect to the rotating shaft SF with the rotating shaft SF as a central axis. For example, the disk member S is formed in a disk shape from a metal material such as aluminum or an aluminum compound. As a constituent material of the disk member S, other metal materials (for example, stainless steel, titanium, nickel, brass, or a combination thereof) may be used.

The disk member S includes a hub 20, a pattern-forming portion 21, a protrusion part 22, and a groove portion 23. An insertion hole 20a (fixing portion to be fixed) is formed at the lower surface side of the hub 20 at a center portion in plan view. The insertion hole 20a is formed so that the rotating shaft SF of the motor apparatus MTR is inserted into the insertion hole 20a. The hub 20 includes a fixing mechanism (not shown) which fixes a portion between the rotating shaft SF and the hub 20 in a state where the rotating shaft SF is inserted into the insertion hole 20a.

The pattern-forming portion 21 is an annular portion which is provided at the peripheral edge part of the hub 20. A first surface Sa (pattern surface) of the disk member S is formed at the upper surface side of the pattern-forming portion 21. For example, the first surface Sa is mirror-processed so as to be formed to be flat. A light reflection pattern 24 is formed at the first surface Sa. For example, the light reflection pattern 24 is one-rotation information which is annularly formed along the circumferential direction of the disk member S.

The protrusion part 22 is provided at a center in plan view of the hub 20, and is formed to protrude toward the upper surface side of the hub 20. The groove portion 23 is a portion which is annularly formed between the pattern-forming portion 21 and the protrusion part 22 at the upper surface side of the hub 20. A fixing member (not shown) which fixes the disk member S to the rotating shaft SF is mounted on the protrusion part 22.

The magnet member M is accommodated in the groove portion 23 of the disk member S. The magnet member M is a permanent magnet which is annularly formed along the rotation direction of the disk member S. A predetermined magnetic pattern is formed on the magnet member M. For example, the magnetic pattern is multi-rotation information which is annularly formed along the circumferential direction of the magnet member M.

As an example of the magnetic pattern of the magnet member M, there is a magnetic pattern in which a half annular region when viewed in an axial direction of the rotating shaft SF is magnetized to the N pole and the other half annular region is magnetized to the S pole, or the like. The magnetic pattern is formed at the first surface Sa side of the rotatory member R which is formed in a disk shape. For example, a portion between disk member S and the magnet member M is fixed via an adhesive agent (not shown) or the like.

The detection unit D is a portion which detects a magnetic field by the light reflection pattern 24 and the magnet member M. The detection unit D includes a casing 30, a light sensor 31, and a magnetic sensor 32.

For example, the casing 30 is formed in a circular cup shape (cylindrical shape) in plan view. The casing 30 is fixed to the motor main body BD which rotates the rotating shaft SF in the motor apparatus MTR, and is not fixed to the rotating shaft SF. Accordingly, even when the rotating shaft SF is rotated, a relative position between the casing 30 and the motor apparatus MTR is not changed. The casing 30 accommodates the disk member S and the magnet member M which are integrally formed. When viewed in the axial direction of the rotating shaft SF, the disk member S and the magnet member M are accommodated in a state where each center of the disk member S and the magnet member M is positioned to coincide with the center of the casing 30.

The light sensor 31 is a sensor which emits light toward the light reflection pattern 24 and detects the light reflection pattern 24 by reading the reflected light. For example, the light sensor 31 is disposed at a position at which the light sensor overlaps with the light reflection pattern 24 of the disk member S when viewed in the axial direction of the rotating shaft SF. The light sensor 31 includes a light-emitting unit emitting light and a light-receiving unit receiving the reflected light. For example, as the light-emitting unit, a LED or the like is used. For example, as the light-receiving unit, a photoelectric element or the like is used. The light read by the light-receiving unit is sent to a controller (not shown) as an electrical signal. Each unit configuring the light sensor 31 is held in the casing 30.

For example, a pair of magnetic sensors 32 (magnetic sensors 32A and 32B) are disposed at a position at which the magnetic sensors overlap with the magnet member M when viewed in the axial direction of the rotating shaft SF. Each of the magnetic sensors 32A and 32B includes a bias magnet (not shown) and a magnetic resistance element (not shown). Each of the magnetic sensors 32A and 32B is held in the casing 30.

The bias magnet is a magnet which forms a composite magnetic field between a magnetic field of the magnet member M and the bias magnet. For example, as a material configuring the bias magnet, a rare-earth magnet having a large magnetic force such as samarium cobalt or the like is used. The bias magnet is disposed at a position at which the bias magnet is not in contact with or is not adjacent to the magnetic resistance element.

For example, the magnetic resistance element includes two orthogonally repeated patterns which are formed by metal lines or the like. In the magnetic resistance element, an electrical resistance decreases if the direction of the magnetic field approaches a direction perpendicular to the direction of the current flowing in the repeated pattern. The magnetic resistance element converts the direction of the magnetic field into an electrical signal by using the decrease in the electrical resistance. The magnetic resistance element detects the composite magnetic field by the magnetic field of the magnet member M and the magnetic field of the bias magnet. The detected result is sent to the controller (not shown) as an electrical signal.

The detection unit D detects the one-rotation information by the light sensor 31 as movement information (for example, rotation information) and detects the multi-rotation information in the magnetic sensor 32. The controller performs processing in which the rotation angle of the rotating shaft SF is obtained based on the one-rotation information output from the light sensor 31 and the rotating speed of the rotating shaft SF is obtained based on the multi-rotation information output from the magnetic sensors 32A and 32B.

Figure 2:
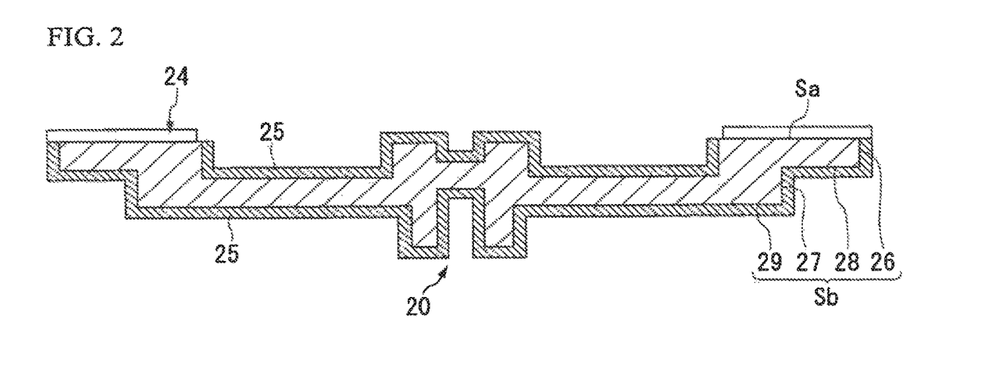
FIG. 2 is a diagram showing a configuration of a portion of an encoder according to the present embodiment.

FIG. 2 is an enlarged diagram showing the cross-section of the rotary member R. In addition, in FIG. 2, the illustration of the magnet member M is omitted.

As shown in FIG. 2, a passive state member 25 is formed on a second surface Sb which is different from the first surface Sa in the disk member S. Moreover, the second surface Sb includes a side portion (first side portion 26 or second side portion 27) of the disk member S which is a side surface with respect to the first surface Sa, a first rear surface 28 which is positioned at the rear side of the first surface Sa, a second rear surface 29 which is positioned at the rear side of the groove portion 23, a surface of the hub 20, a surface of the insertion hole 20a, or the like.

The passive state member 25 is a coating film subjected to passivation processing and is an oxide film which covers the second surface Sb of the disk member S. In the present embodiment, the disk member S is formed using aluminum and the passive state member 25 is an aluminum oxide film ($Al_2O_3$). For example, the passive state member 25 has a property in which the passive state member is not easily dissolved with respect to a solution (acid solution or alkali solution) of approximately 2 to 14. The passive state member 25 has higher hardness than that of pure aluminum material. Accordingly, for example, when the passive state member comes into contact with a tool from the outside, the passive state member is not easily damaged and is not easily deformed.

The passive state member 25 is formed on approximately the entire surface of the second surface Sb. Accordingly, approximately the entire surface of the second surface Sb is not easily dissolved with acid solution and alkali solution. In addition, approximately the entire surface of the second surface Sb is not easily damaged and is not easily deformed. Accordingly, a burden on a worker can be decreased in a process of manufacturing the disk member S of the encoder EC, a process of mounting the encoder EC on the rotating shaft SF, or the like.

Figure 3:
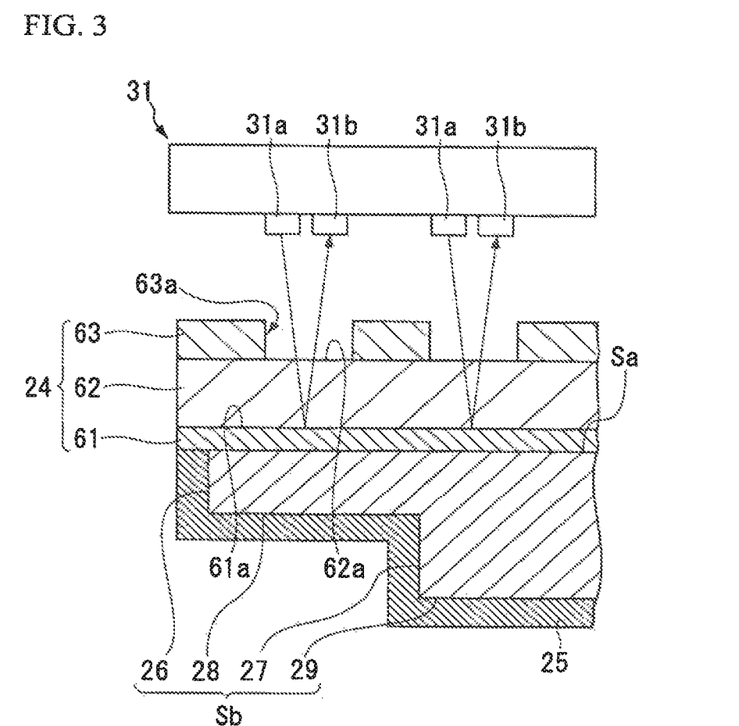
FIG. 3 is a diagram showing the configuration of a portion of the encoder according to the present embodiment.

FIG. 3 is a cross-sectional diagram showing a configuration (film configuration) of the light reflection pattern 24.

As shown in FIG. 3, the light reflection pattern 24 includes a light reflection layer 61, a protective layer 62, and a light absorption layer 63. Each of the light reflection layer 61, the protective layer 62, and the light absorption layer 63 has a predetermined layer thickness.

The light reflection layer 61 is formed on the first surface Sa of the disk member S. The light reflection layer 61 has a light reflection surface 61a. The light reflection surface 61a reflects the light emitted from a light-emitting element 31a of the light sensor 31 toward a light-receiving element 31b. For example, the light reflection layer 61 is formed using a metal material having high light reflectivity such as aluminum. As the light reflection layer 61, other metal materials (for example, stainless steel, silver, a combination thereof, or the like) may also be used.

The protective layer 62 has light transparency and is formed on the light reflection surface 61a of the light reflection layer 61.

The protective layer 62 covers the light reflection surface 61a. For example, the protective layer 62 is formed using a material having high light transparency such as silicon dioxide ($SiO_2$). The protective layer 62 protects the light reflection surface 61a from corrosion or the like while transmitting the light from the light-emitting element 31a. For example, as the protective layer 62, a resin material such as acrylic resin, other oxide films, or the like may be used.

The light absorption layer 63 is patterned on the surface 62a of the protective layer 62. The light absorption layer 63 has lower light reflectivity than that of the light reflection layer 61. For example, the light absorption layer 63 is formed using a metal such as chromium (Cr) or a metal compound such as chromium oxide (for example, $Cr_2O_3$ and the like) or chromium nitride (for example, CrN), having high light absorptivity.

An opening portion 63a is formed at the light absorption layer 63. The opening portion 63a is formed in a predetermined shape along the circumferential direction of the disk member S. The opening portion 63a makes the light from the light-emitting element 31a pass through.

Next, as described above, examples of manufacturing method of a scale of the encoder EC and manufacturing method of the encoder EC will be described.

Figure 4:
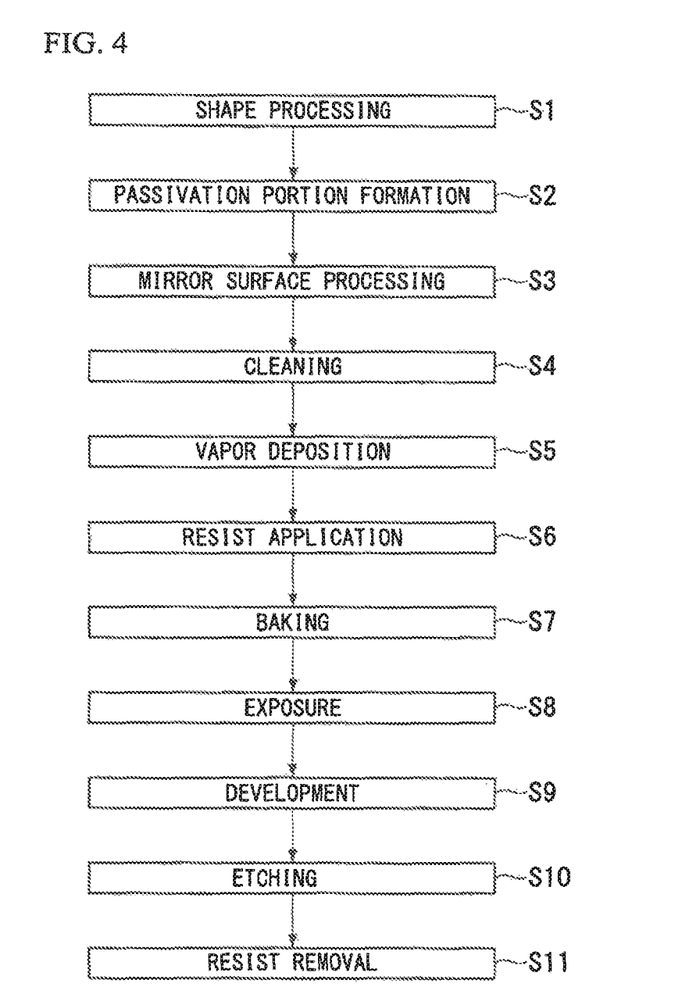
FIG. 4 is a flowchart showing a manufacturing method of an encoder according to the present embodiment.
Figure 5:
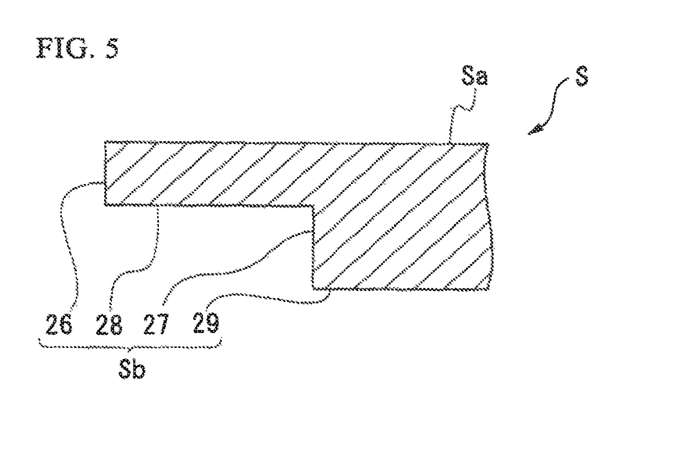
FIG. 5 is a process diagram showing a manufacturing process of the encoder according to the present embodiment.

FIG. 4 is a flowchart showing a process of manufacturing the scale (rotatory member) R of the encoder EC. In addition, FIGS. 5 to 12 are diagrams showing manners of the manufacturing process of the rotatory member R. Hereinafter, the manufacturing method of the rotatory member R of the encoder EC will be described with reference to FIGS. 4 to 12. In order to manufacture the rotatory member R, first, as shown in FIG. 5, a disk member S including the first surface Sa and the second surface Sb is formed using an aluminum material (S1: shape-processing process)

Next, the passive state member is formed on the disk member S (S2: passive state member-forming process). In the passive state member-forming process, for example, the entire disk member S is immersed into an electrolyte solution, and electrolysis (electroplating) is performed in a state where the disk member S is set o an anode.

Figure 6:
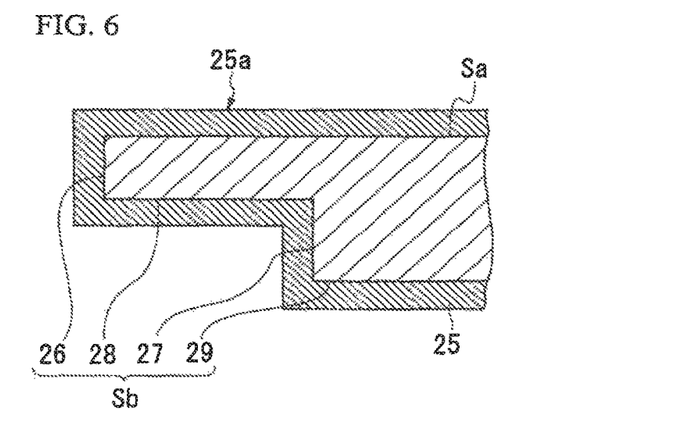
FIG. 6 is a process diagram showing the manufacturing method of the encoder according to the present embodiment.

Accordingly, as shown in FIG. 6, an aluminum oxide film ($Al_2O_3$) having a predetermined film thickness is formed on the entire surface of the disk member S including the first surface Sa and the second surface Sb. This oxide film is a passive state member 25. In addition, a method of forming the passive state member is not limited to electroplating, and various methods can be applied. Moreover, when the passive state member is formed, a masking process may be performed. In addition, the passive state member-forming process can be performed at an arbitrary timing. In another example, during a pattern layer-forming process (for example, after a resist application process (baking process)) described below or after the pattern layer-forming process, the passive state member can be formed.

Figure 7:
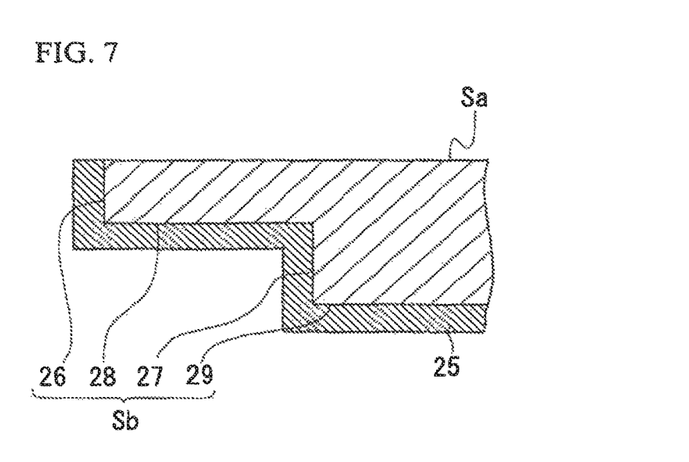
FIG. 7 is a process diagram showing the manufacturing method of the encoder according to the present embodiment.

Next, mirror surface processing is performed on at least the first surface Sa of the disk member S (S3: mirror surface-processing process). In the mirror surface-processing process, the first surface Sa side of the disk member S, in which the passive state member 25 is formed on the entire surface, is cut or polished. In this process, a portion 25a, (refer to FIG. 6) which is formed on the first surface Sa in the passive state member 25, is removed by polishing, and as shown in FIG. 7, the first surface Sa is exposed. Thereafter, the exposed first surface Sa is further polished, and the first surface Sa becomes a mirror surface. In this way, in the mirror surface-processing process, the operation of removing the portion 25a formed on the first surface Sa in the passive state member 25 is also performed. Moreover, diffuse reflection of the light on the first surface Sa can be decreased by this mirror surface-processing process. After the mirror surface-processing process is performed, cleaning is performed on the first surface Sa using ABZOL, a cleaning agent, or the like (S4: cleaning process). In addition, in the mirror surface-processing process of the present embodiment, the mirror surface processing may be selectively performed on a predetermined portion (for example, at least the first surface Sa) of the disk member S by cutting, polishing, or the like.

Figure 8:
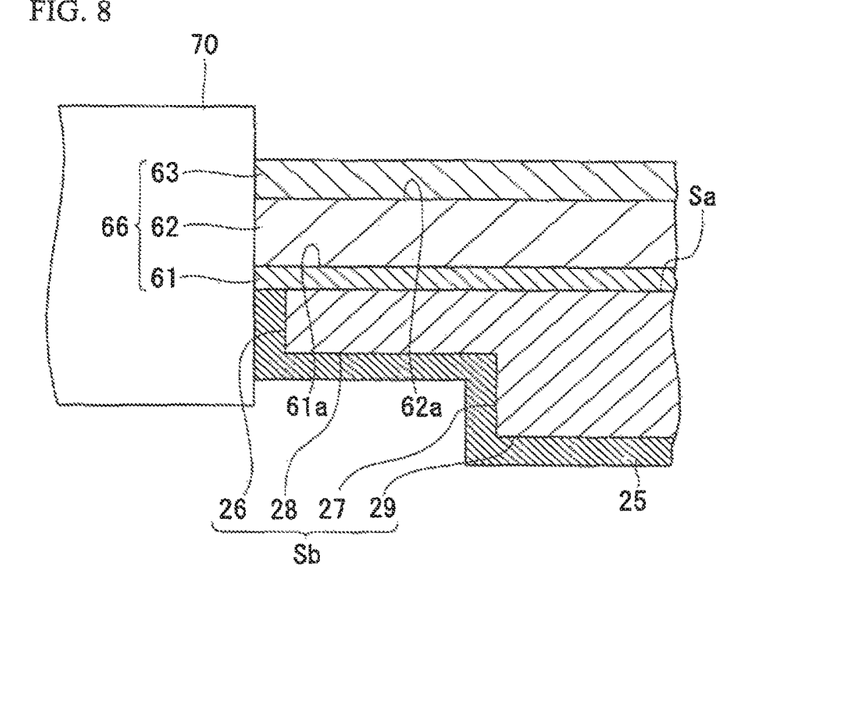
FIG. 8 is a process diagram showing the manufacturing method of the encoder according to the present embodiment.

After the cleaning is performed, each layer (pattern layer 66) configuring the light reflection pattern 24 is formed on the first surface Sa (pattern layer-forming process (S5 to S11)). In the pattern layer-forming process, as shown in FIG. 8, the first side portion 26 of the disk member S is held by a tool 70. Moreover, the disk member S may be held in a state where a portion of the tool 70 is inserted into the insertion hole 20a of the hub 20.

In this way, in the state where the disk member S is held by the tool 70, for example, the light reflection layer 61, the protective layer 62, and the light absorption layer 63 are laminated on the first surface Sa in this order by a vapor deposition method (S5: vapor deposition process). When the disk member S is held by the tool 70, for example, in a case where the hardness of the first side portion 26 is insufficient, the first side portion 26 may be damaged or deformed by the tool 70. Moreover, for example, when the hardness of the surface of the insertion hole 20a is insufficient, scratches (indentations) may be formed in the inner portion of the insertion hole 20a by the tool 70. The indentations become dimension errors when the rotating shaft SF is inserted into the insertion hole 20a. In the present embodiment, since the passive state member 25 is formed on the entire surface of the second surface Sb of the disk member S including the surfaces of the first side portion 26 and the insertion hole 20a, for example, even when the tool 70 or the like comes into contact with the surface from the outside, scratches are not easily generated and deformation is not easily caused.

Figure 9:
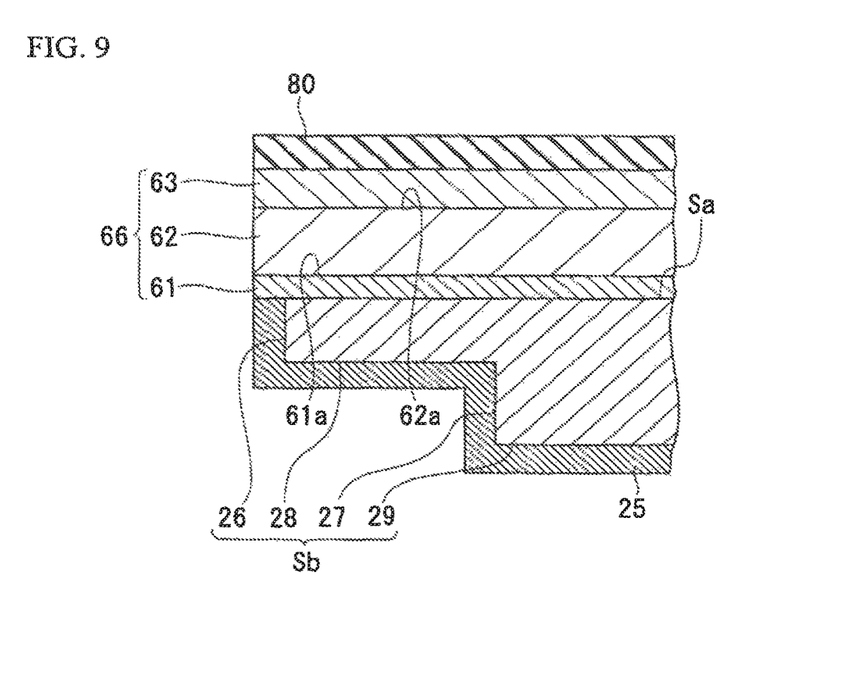
FIG. 9 is a process diagram showing the manufacturing method of the encoder according to the present embodiment.

Thereafter, as shown in FIG. 9, for example, a resist layer 80 is coated on the light absorption layer 63 by a spin coat method (56: resist application process). After the resist layer 80 is coated on the light absorption layer 63, prebaking processing is performed on the resist layer 80, and the resist layer 8 is dried (S7: baking process) Thereafter, exposure processing is performed on the resist layer 80 (S8: exposure process). In the exposure processing, exposure light irradiates the portion forming the pattern of a high reflection region in the resist layer 80. By the exposure processing, in the exposed portion of the resist layer 80 to which the exposure light is radiated, solubility with respect to developer is decreased, and the exposure portion is hardened. In addition, an unexposed portion of the resist layer 80, to which the exposure light is not radiated, is dissolved in the developer in the development process. Moreover, in the exposure processing with respect to the resist layer 80, the exposure may be performed on a negative type resist layer, and the exposure may be performed on a positive type resist layer. In the present embodiment, the resist layer may be either a negative type resist or a positive type resist.

Figure 10:
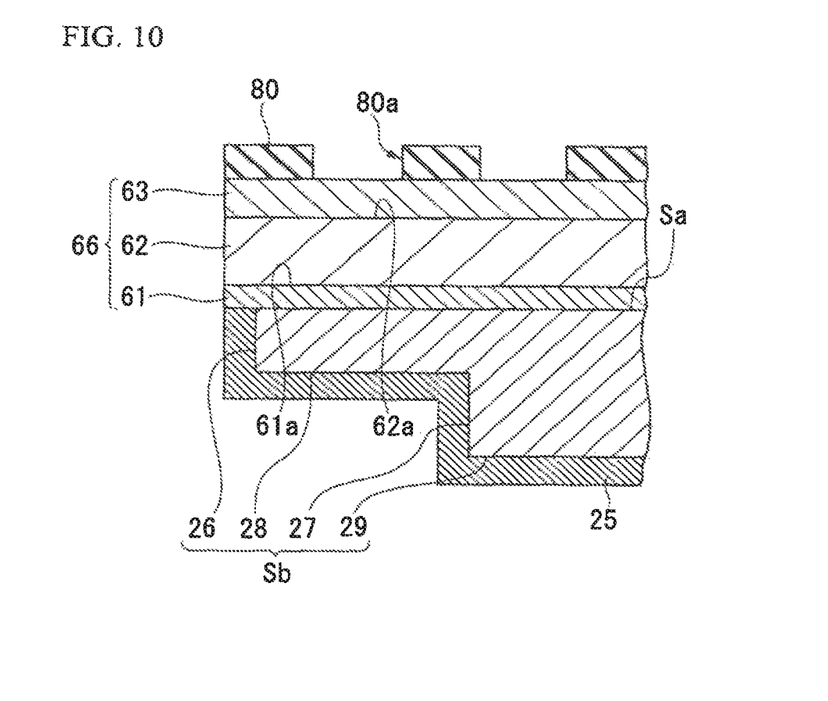
FIG. 10 is a process diagram showing the manufacturing method of the encoder according to the present embodiment.

After the exposure process is performed, post-baking processing is performed on the resist layer 80. Thereafter, the development process is performed on the resist layer 80 (S9: development process). In the development process, the unexposed portion of the resist layer 80 is dissolved using the developer. According to the process, as shown in FIG. 10, the opening portion 80a is formed at a place at which the unexposed portion is formed in the resist layer 80. After the development process is performed, hard baking processing is performed on the resist layer 80.

Thereafter, the portion of the light absorption layer 63, which is exposed from the opening portion 80a of the resist layer 80, is removed by an etching method (S10: etching process). In the etching process, the entire disk member S is immersed into the etching liquid in the state where the resist layer 80 including the pattern layer 66 and the opening portion 80a is formed. As the etching liquid, for example, a solution (acid solution or alkali solution) of approximately pH 2 to pH 14 is used.

Figure 11:
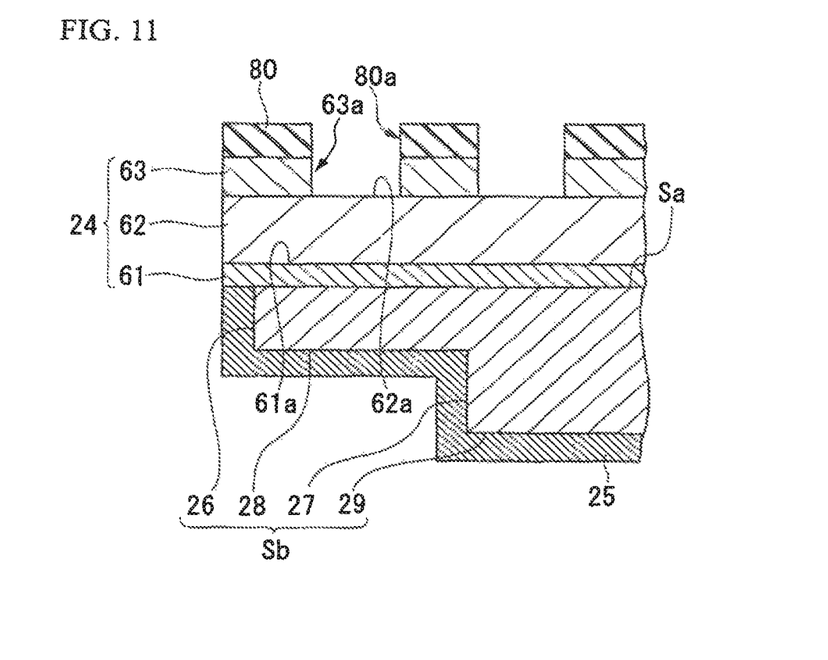
FIG. 11 is a process diagram showing the manufacturing method of the encoder according to the present embodiment.

According to this processing, the portion of the light absorption layer 63 exposed from the opening portion 80a is dissolved in the etching liquid, and thus, as shown in FIG. 11, the opening portion 63a is formed and the light reflection pattern 24 is formed. In the etching process, for example, by controlling a time during which the portion is immersed in the etching liquid, the shape of the opening portion 63a of the light absorption layer 63 can be adjusted.

Here, in the etching process, for example, when a portion of the disk member S is dissolved in the etching liquid, the disk member S is deformed by the dissolution. Accordingly, when this disk member is used as the rotatory member R of the encoder EC, there is a concern that problems may occur with respect to rotation accuracy.

In addition, for example, there is a possibility that the dissolved portion floats around the etching liquid, and may enter the opening portion 80a and may be fixed to the opening portion. In this case, the fixed aluminum component functions as an etching mask, and a portion of the light absorption layer 63 is not removed and remains on the opening portion 63a. In this case, since light reflection characteristics of the light reflection pattern 24 are changed, there is a concern that detection errors of the encoder EC may occur.

On the other hand, in the present embodiment, since the passive state member 25 is formed on the approximately entire surface of the second surface Sb of the disk member S, the disk member S being dissolved in the etching liquid can be avoided. Accordingly, a problem in the rotation accuracy or a problem in the detection error can be avoided or be decreased.

Figure 12:
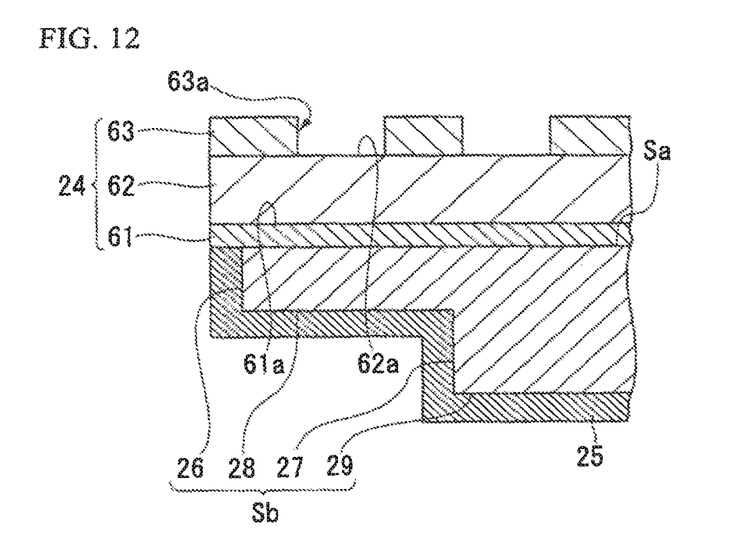
FIG. 12 is a process diagram showing the manufacturing method of the encoder according to the present embodiment.

After the light reflection pattern 24 is formed, as shown in FIG. 12, the resist layer 80 is removed (S11: resist removal process).

As the removal method of the resist layer 80, for example, there is a method in which the disk member S, on which the resist layer 80 is formed, is immersed into a resist-peeling liquid, or the like. For example, the resist-peeling liquid can be appropriately selected according to the kind of photoresist used. In addition, immersion processing conditions can be appropriately set according to the kind of resist-peeling liquid used. After the resist layer 80 is removed, the rotatory member R is obtained by mounting the magnet member M on the groove portion 23 of the disk member S. In addition, in the film configuration shown in FIG. 12, a second protective film having light transparency may be formed so as to cover the light reflection pattern 24.

In addition, the encoder EC can be obtained by separately forming (detection unit-forming process) the detection unit D. Moreover, the rotatory member R (disk member S) of the encoder EC is mounted on the rotating shaft SF of the motor apparatus MTR, the detection unit D is mounted on the driving unit AC of the motor apparatus MTR, and thus, the motor apparatus MTR on which the encoder EC shown in FIG. 1 is mounted can be obtained. When the rotating shaft SF is inserted into the insertion hole 20a, in a case where the hardness of the surface of the insertion hole 20a is insufficient, scratches are formed in the inner portion of the insertion hole 20a by the rotating shaft SF, and there is a case in which eccentricity of the motor apparatus MTR cannot be easily obtained. Conversely, in the present embodiment, since the passive state member 25 is formed on the surface of the insertion hole 20a provided in the hub 20 of the disk member S, scratches can be prevented from occurring in the inner portion of the insertion hole 20a when the rotating shaft SF is inserted into the insertion hole 20a. Accordingly, difficulty in obtaining the eccentricity of the motor apparatus MTR can be prevented.

As described above, the encoder EC according to the present embodiment includes the rotary member R which has the disk member S fixed to the rotating shaft SF of the motor apparatus MTR fanned using a metal material, and in which the light reflection pattern 24 is formed on the first surface Sa of the disk member S and the passive state member 25 is formed on the second surface Sb different from the first surface Sa in the disk member S; and the detection unit D which detects the light reflection pattern 24, and thus, the approximately entire surface of the second surface Sb is protected from an acid solution or an alkali solution. Accordingly, when the etching processing is performed by the process of manufacturing the disk member S of the encoder EC, a decrease in patterning accuracy can be avoided, and thus, a decrease in the yield rate can be prevented.

In addition, since the passive state member 25 is an aluminum oxide film ($Al_2O_3$), the hardness on the approximately entire surface of the second surface Sb of the disk member S is increased. Accordingly, scratches do not easily occur on the approximately entire surface of the second surface Sb and the entire surface is not easily deformed. Therefore, when the tool 70 or the like comes into contact with the disk member S from the outside in the process of manufacturing the disk member S of the encoder EC or the process in which the encoder EC is mounted on the rotating shaft SF, occurrence of dimensional errors can be prevented.

The technical scope of the present invention is not limited to the embodiment, and can be appropriately changed within a scope which does not depart from the gist of the present invention In the above-described embodiment, the configuration in which the light reflection layer 61 is formed on the first surface Sa of the mirror-surface-processed disk member S is described as an example. However, the present invention is not limited thereto. For example, a configuration may be adopted in which the light reflection layer 61 is not formed, the mirror-surface-processed first surface Sa is set to the light reflection layer, and the protective layer 62 is directly formed on the first surface Sa. In addition, for example, the light reflection layer 61 and the mirror-surface-processed first surface Sa may be configured as the light reflection layer. Moreover, the encoder EC in the above-described embodiment is configured as a rotary encoder. However, the encoder may be configured as a linear encoder. Accordingly, the scale unit (scale) in the encoder EC of the above-described embodiment may be not only a disk-shaped rotary scale but also a linear scale.

DESCRIPTION OF THE REFERENCE SYMBOLS

MTR: motor apparatus, SF: rotating shaft, BD: motor main body, EC: encoder, R: rotatory member, D: detection unit, S: disk member, M: magnet member, Sa: first surface, Sb: second surface, AC: driving unit, 20: hub, 20a: insertion hole, 24: light reflection pattern, passive state member, 25a: portion, 26: first side portion, second side portion, 28: first rear surface, 29: second rear surface, 31: light sensor, 31a: light-emitting element, 31b: light-receiving element, 61: light reflection layer, 61a: light reflection surface, 62: protective layer, 63: light absorption layer, 63a: opening portion, 66: pattern layer, 70: tool, 80: resist layer, 80a: opening portion.

The invention claimed is:

1. An encoder comprising:
a scale unit having a substrate configured of a metal material and in which a pattern is formed on a first surface of the substrate and a passive state member is formed on a second surface different from the first surface in the substrate; and
a detection unit that is configured to move relative to the scale unit and detects the pattern,
wherein the pattern has a configuration such that a light reflection layer is formed on the first surface, a protective layer having light transparency is formed on the light reflection layer, and a light absorption layer is formed on the protective layer.

2. The encoder according to claim 1,
wherein the first surface is a pattern surface on which the pattern is formed in the substrate, and
wherein the second surface is provided at a side portion of the substrate which is a side surface with respect to the pattern surface.

3. The encoder according to claim 1,
wherein the substrate includes a fixing portion which is fixed to a moving body of a measuring target, and
wherein the passive state member is formed on a surface of the fixing portion.

4. The encoder according to claim 1,
wherein the pattern is annularly formed on the first surface.

5. The encoder according to claim 1,
wherein the first surface is made capable to reflect light by a mirror surface processing.

6. The encoder according to claim 1,
wherein the metal material includes aluminum or an aluminum compound.

7. The encoder according to claim 1,
wherein the passive state member is configured of an oxide film.

8. The encoder according to claim 7,
wherein the oxide film is an aluminum oxide film.

9. A driving apparatus comprising the encoder according to claim 1.

* * * * *